June 11, 1957 W. H. HAHIR ET AL 2,795,315

FLEXIBLE ENDLESS CONVEYORS

Filed Nov. 18, 1948 8 Sheets-Sheet 1

INVENTORS
D. GRAY MAC NEILL
WARD H. HAHIR
BY Henry Gifford Hardy
ATTORNEY

June 11, 1957 W. H. HAHIR ET AL 2,795,315

FLEXIBLE ENDLESS CONVEYORS

Filed Nov. 18, 1948 8 Sheets-Sheet 2

INVENTORS
D. GRAY MAC NEILL
WARD H. HAHIR
BY Henry Gifford Hardy
ATTORNEY

INVENTORS
D. GRAY MAC NEILL
WARD H. HAHIR
BY Henry Gifford Hardy
ATTORNEY

FLEXIBLE ENDLESS CONVEYORS

Filed Nov. 18, 1948 8 Sheets-Sheet 4

INVENTORS
D. GRAY MAC NEILL
WARD H. HAHIR
BY Henry Gifford Hardy,
ATTORNEY

FLEXIBLE ENDLESS CONVEYORS

INVENTORS
D. GRAY MAC NEILL
WARD H. HAHIR
BY
ATTORNEY

FLEXIBLE ENDLESS CONVEYORS

Filed Nov. 18, 1948

INVENTORS
D. GRAY MAC NEILL
WARD H. HAHIR
BY Henry Gifford Hardy.
ATTORNEY

FLEXIBLE ENDLESS CONVEYORS

Filed Nov. 18, 1948 8 Sheets-Sheet 7

INVENTORS
D. GRAY MAC NEILL
WARD H. HAHIR
BY Henry Gifford Hardy
ATTORNEY

INVENTORS
D. GRAY MAC NEILL
WARD H. HAHIR
BY Henry Gifford Hardy.
ATTORNEY

United States Patent Office 2,795,315

Patented June 11, 1957

2,795,315

FLEXIBLE ENDLESS CONVEYORS

Ward H. Hahir, San Mateo, and David Gray MacNeill, San Leandro, Calif., assignors, by mesne assignments, to the United States of America as represented by the Secretary of the Navy Application November 18, 1948, Serial No. 60,734

9 Claims. (Cl. 198—109)

This invention relates to improvements in conveyor systems and more particularly to endless conveyors of the linked roller chain type.

One of the principal contributors to the successful utilization of production lines in industrial operations has been the development of mechanized material handling equipment, such as endless conveyor systems of the belt and link roller chain types. Such conveyor systems have been extensively employed to quickly and economically transport industrial materials and work in process, either continuously or intermittently, to different locations and at different levels with a minimum of manual effort, thus enabling manufacturing materials and finished or partly fabricated articles to be readily moved from machine to machine, from machine to storage, and otherwise as required by the sequence of industrial operations.

A characteristic and troubling disadvantage of such chain type conveying equipment has been its lack of adjustability, for despite the inherent flexibility of the chain itself, such conveyor units of the prior art cannot be substantially varied in their delivery paths because of the rigid track or carriage heretofore considered essential to their operation. Consequently, in conducting loading and unloading operations in such locations as trucks, warehouses and railroad cars, it is often necessary whenever conventional systems are employed to manually transport articles and materials over considerable distances to reach the final delivery points, although such systems would in themselves be long enough to reach the desired delivery point if provided with a flexible delivery carriage. Sometimes this problem has been solved by employing several conveyors which feed each other, but such a solution is an expensive one and requires additional space-consuming equipment which otherwise could be used in other industrial operations.

The disadvantage of inflexibility in conventional conveyor systems becomes readily apparent when such systems are used in conjunction with modern automatic machinery, which frequently requires sufficient flexibility of adjustment for the end of the conveyor to permit the feeding or unloading operation to be performed at particular points within an adjustment zone adjacent to at least one end of the conveyor. Such flexibility of adjustment is also highly advantageous in applications wherein the conveying system cannot be rigidly connected to the consuming or processing device, or in which the feeding or unloading operation must be performed intermittently during particular phases of the operating cycle.

It is the principal object, therefore, of the present invention to provide a conveying mechanism adapted to automatically accept and deliver objects of substantial length over a course or track of close dimensions, which includes curves and reverse curves and which provides a return after delivery.

It is also an object of the present invention to provide a flexible endless conveyor which will automatically adjust itself to the particular requirements of continuously or intermittently conveying such rigid objects as lengths of pipe, wood, and similar materials, even though such objects may vary as to diameter and configuration, while at the same time maintaining sufficient flexibility to make possible the conveying of such rigid lengthy objects over a curved or serpentine delivery path, thereby attaining angular acceptance or delivery without changing the length of the conveyor chain.

It is another object of this invention to provide an endless conveyor system having both rigid and articulated track sections which is particularly adapted to convey relatively long rigid objects over a sinuous path, while at the same time possessing sufficient flexibility of adjustment at the delivery end thereof to permit such objects to be delivered at various locations within a delivery area adjacent to one end of the conveyor.

It is also a further object of this invention to create an endless conveyor system having a guiding track which includes both rigid sections and flexible vertebrae sections so constructed and arranged as to provide flexibility of adjustment for the conveyor, while at the same time permitting the longitudinal movement of relatively long rigid objects over a curved and angularly disposed delivery path.

It is another object of this invention to provide an endless conveyor of the linked roller chain type which is adapted to transport relatively long rigid objects requiring holding at two points, in aligned relationship along a path including curves and reverse curves, and to transport such objects at a rapid rate of speed over alternate rigid and articulated track sections adjustable in at least one end portion thereof in a direction substantially at right angles to the delivery path, thereby attaining angular acceptance or delivery without changing the length of the conveyor belt.

It is also an object of the present invention to provide a conveying device with an adjustable track or carriage including alternate rigid and articulated sections capable of flexibility in a plane normal to the conveying path which will still provide sufficient support for the device. Although the extent to which the disclosed articulation is employed will depend upon the flexibility desired, the articulated sections can be varied to fit almost any requirement of flexibility in the plane vertical to the conveyor path. A single articulated section may suffice in many instances, whereas in other applications several spaced-apart articulated sections may be required.

Another object of the present invention is to provide a method of articulation for an endless conveyor system for use in automatic vending machines and the like which can be adapted to a variety of degrees of flexibility, and which can be held in a normally curved or straight path as the need requires.

Such objects are accomplished by providing a flexible endless conveyor which includes an endless roller linked belt built to accommodate suitable clamping or holding devices. This endless flexible roller belt is guided in its path preferably, but not necessarily, by parallel double tracks which support and enclose the belt except at each end where it travels about a drive sprocket or idler gear. Thus, there preferably are two sets of double parallel tracks held in normally parallel spaced-apart relationship, the one set of tracks guiding the conveyor belt to the end of the conveyor and the other guiding the belt on the return trip back to the starting point.

Two types of tracks are used to support the conveyor belt, both being U-shaped to form a running bearing surface for the appropriate bearings of the rollers, so that the flat section thereof supports and holds the rollers which extend between them. One type of track section is composed of rigid members which allow no movement, while the flexible track sections are articulated or joined, and consist of a plurality of vertebrae type clevis link members arranged in series.

Further objects are to provide a construction of maximum simplicity, economy and ease of operation, and such further objects, advantages or capabilities as will fully appear and as are inherently possessed by the device and invention described herein.

The invention further resides in the combination, construction and arrangement of parts illustrated in the accompanying drawing, and while there is shown therein a preferred embodiment thereof, it is to be understood that the same is illustrative of the invention and that the invention is capable of modification and change and comprehends other details of construction without departing from the spirit thereof or the scope of the appended claims.

Referring to the drawings.

Figure 18:
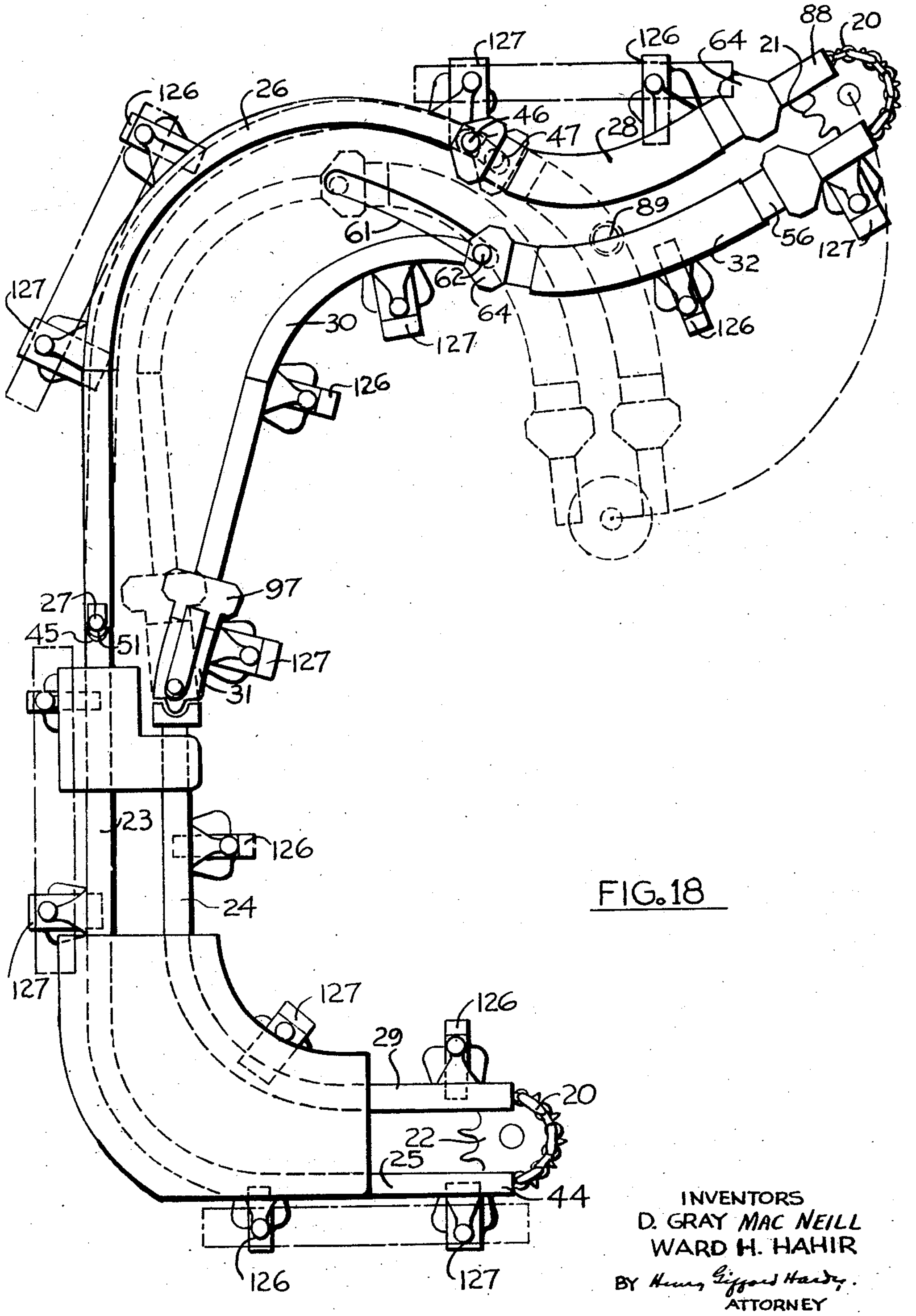
Figure 18 is a schematic side elevational view of the delivery and return track assembly illustrated in Figure 1, showing the range of adjustment thereof.

Referring now more particularly to the drawings in which like reference numerals indicate like parts in the several views, there is shown in Figure 18 a flexible endless conveyor system which comprises a belt 20, preferably of the link roller chain type, which passes over an idler sprocket 21, of a type which takes up no slack in the chain 20 but provides compensation for chain wear only, and is driven by an intermittently or continuously rotating drive sprocket 22 along a course determined by the delivery and return track assemblies generally identified as 23 and 24, respectively.

The delivery track assembly 23 forms a track housing which includes in series the fixed lower loading section 25, the upper conveying section 26, supported for pivotal movement on the section 25 by the pins 27, and the flexible delivery track section 28. Similarly, the return track assembly 24 includes in series the fixed lower return section 29, the upper return track section 30 movably supported on the section 29 by the intermediate flexible track section 31, and the flexible return track section 32. All of the various sections which comprise the assemblies 23 and 24 are joined together to form an endless conveyor track of constant length.

The delivery and return track assemblies 23 and 24 are formed of identical pairs of spaced-apart and oppositely disposed channels 34 of substantially U-shaped cross-section. The fixed lower loading and return track sections 25 and 29 thereof each have a straight horizontal portion 36 and a vertical portion 37 respectively, with a circular portion therebetween.

The channels 34 for the track sections 25 and 29 have their web elements 33 attached by welding or other suitable means to the parallel spaced-part plates 40 and 41, which are secured to a foundation or supporting structure by suitable attaching bolts extending through the holes 42 drilled in the plates 40 and 41. The webs 33 and the inwardly disposed flanges 43 of the sections 25 and 29 are spaced apart to form a track of a width adapted to receive the linked roller chain belt 20 for close sliding engagement therewith. The extremities of the horizontal portions 36 of the sections 25 and 29 are shaped to form bearing saddles 44 which are adapted to be affixed to the drive sprocket assembly 22. The upper extremity of the vertical portion 37 of each section 25 and 29 preferably has a cradle bearing 45 formed therein in such a manner as to cooperate with a similar shaped tongue element 51 formed on the lower extremity of each upper conveying section 26, so as to form a pivotal support therefor. The upper track sections 26 and 30 are composed of U-shaped channel members 34 in the same manner as sections 25 and 29, and include substantially vertical lower portions 52 and circular upper portions 53 joined at their abutting extremities by the plates 54 and the bolts 39. The oppositely disposed U-shaped channel members 34 which comprise the sections 26 and 30 are secured to and retained in predetermined spaced-apart relationship by the cross-bracing members 55 which have their extremities 50 permanently affixed thereto. Preferably, a pin 46 secured to the circular upper portion 53 engages with a conventional kidney bearing 47 mounted on the supporting structure so that the pin 46 provides adjustable support for the upper portions 53 during pivotal movement of the pin 46 about the cradle bearing 45 as an axis.

The sides of the terminal fittings 56 of the flexible track sections 28 and 32 are attached to the adjacent sides of the respective movable track sections 26 and 30 by the plates 64, which are detachably secured thereto by bolting or other conventional means. Two identical but oppositely disposed terminals 56 constitute the extremities of the flexible track sections 28 and 32. Each terminal 56 has affixed to the interior side portion thereof by the screws 64′ a key member 58 which is arranged to interlock with the coacting section of the respective track assemblies 23 and 24 to facilitate smooth transitional movement of the roller chain 20 across the junctions which join the flexible track sections 28 and 32 with the sections associated therewith. Interposed between the oppositely disposed terminal fittings 56 at the extremities of each of the flexible track sections 28 and 32 is a plurality of interlocking clevis links or vertebrae members 60. Each of the interlocking clevis links 60 is formed with a pair of bifurcated tongue portions 66 adapted to engage with a grooved bottom portion 65 of an adjacent link having a hole 65′ drilled therein for receiving a clevis pin 67 so as to form a clevis joint which is adapted to be flexed in a plane normal to the axis of the clevis pin which joins the articulated links 60 together. The link members 60 also have oppositely disposed side portions 68 having longitudinal grooves 69 and 70 cut in the top and bottom portions thereof, respectively.

Figure 3:
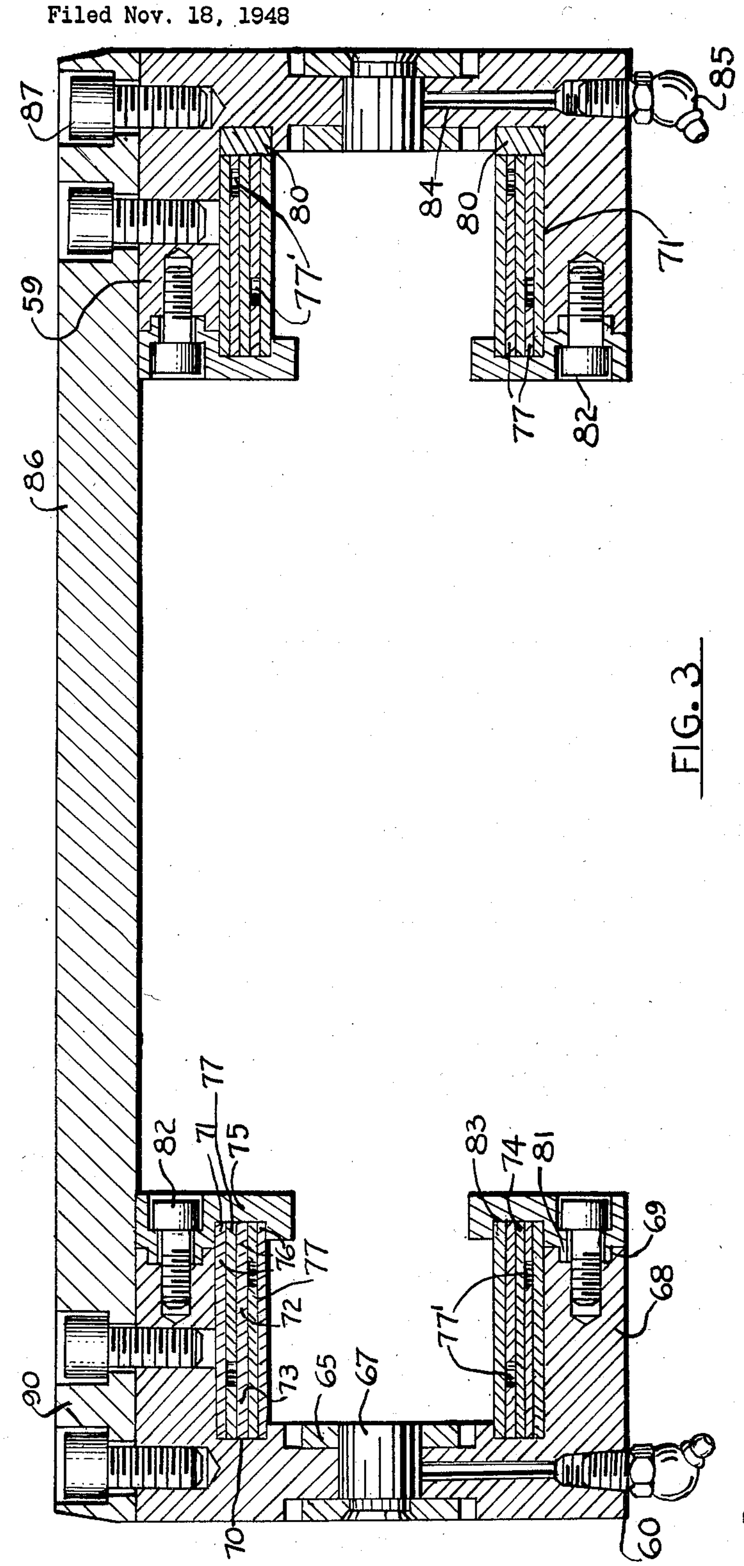
Figure 3 is a cross-sectional view to an enlarged scale taken along the lines III—III of Figure 2.

Vertically disposed along the interior side walls 71 of the clevis links 60 and in sliding engagement therewith is a laminated leaf spring 72, preferably composed of a plurality of steel strips 76 having alternate layers of bronze 77 therebetween. If desired, the bronze layers 77 may have perforations 77′ formed therein at spaced-apart intervals so as to retain a suitable lubricant for the laminated springs 72. The lower extremities 73 of the laminated springs 72 are adapted to be received and retained by the grooves 70 for sliding engagement therewith. Midway between the extremities 73 of the springs 72 a keeper 80 secures the springs to the clevis link which coacts with the midpoint of the laminated springs 72 to retain them in the middle of the flexible track sections 28 and 32. A clamp member 75 has a tongue 81 adapted to fit into the groove 69 and is secured to the side portions 68 of the links 60 by a recessed screw 82. Each clamp member 75 also has formed therein a longitudinal groove 83 having the same general shape as the groove 70, so that the grooves 70 and 83 engage in a loose sliding fit the lower and upper extremities 73 and 74, respectively, of the laminated springs 72, so that they are free to bend with flexure of the flexible track sections 28 and 32. The laminated springs 72 cannot be rigidly held by the terminal fittings 56 because the springs 72 must vary in length to conform to the increase or decrease in the length of the arc as each articulated section 28 and 32 is bent. In order to compensate for this change and provide the necessary elasticity, there is formed in each end of the laminated springs 72 a slot 78 which slidably engages with the key members 58 so that the latter may go back and forth in the slot 78 as needed, thereby lengthening or shortening the amount of spring within the articulated portion of the flexible track sections 28 and 32, as required. A small bore 84 and lubrication fitting 85 in each clevis link member 60 is adapted to supply a suitable lubricant to the clevis pins 67. Also secured to the opposite sides 59 of the members 60 from the fittings 85 is a plurality of parallel spaced-apart bridge members 86 which have their ends 90 secured to the clevis links 60 by the recessed screws 87, so as to retain each oppositely disposed series of link members 60 in substantially parallel spaced-apart relationship, as is best illustrated in Figures 3, 4, and 5.

Figure 1:
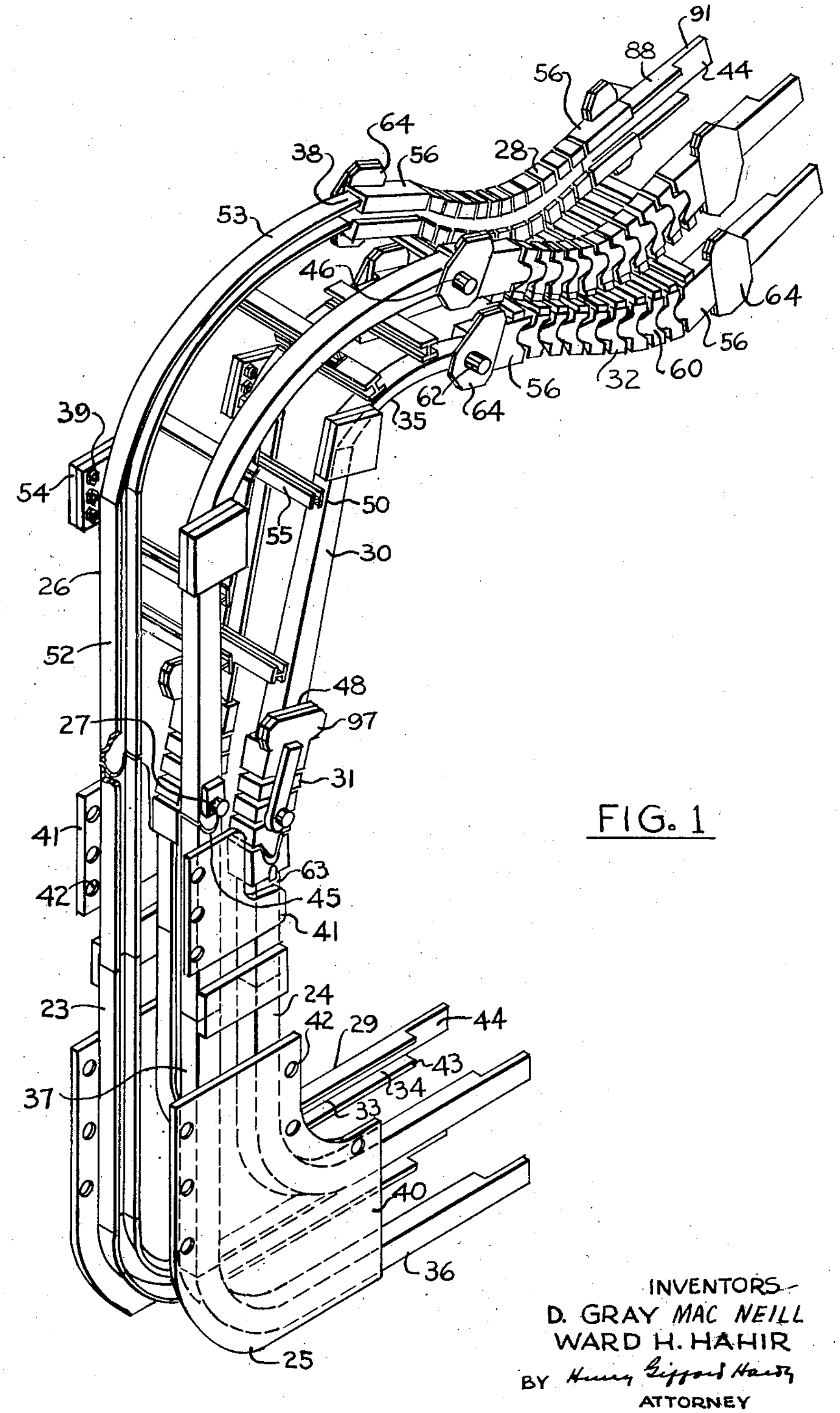
Figure 1 is a perspective view of the delivery and return track assembly for a flexible endless conveyor, showing both the rigid and articulated sections which comprise the same.
Figure 2:
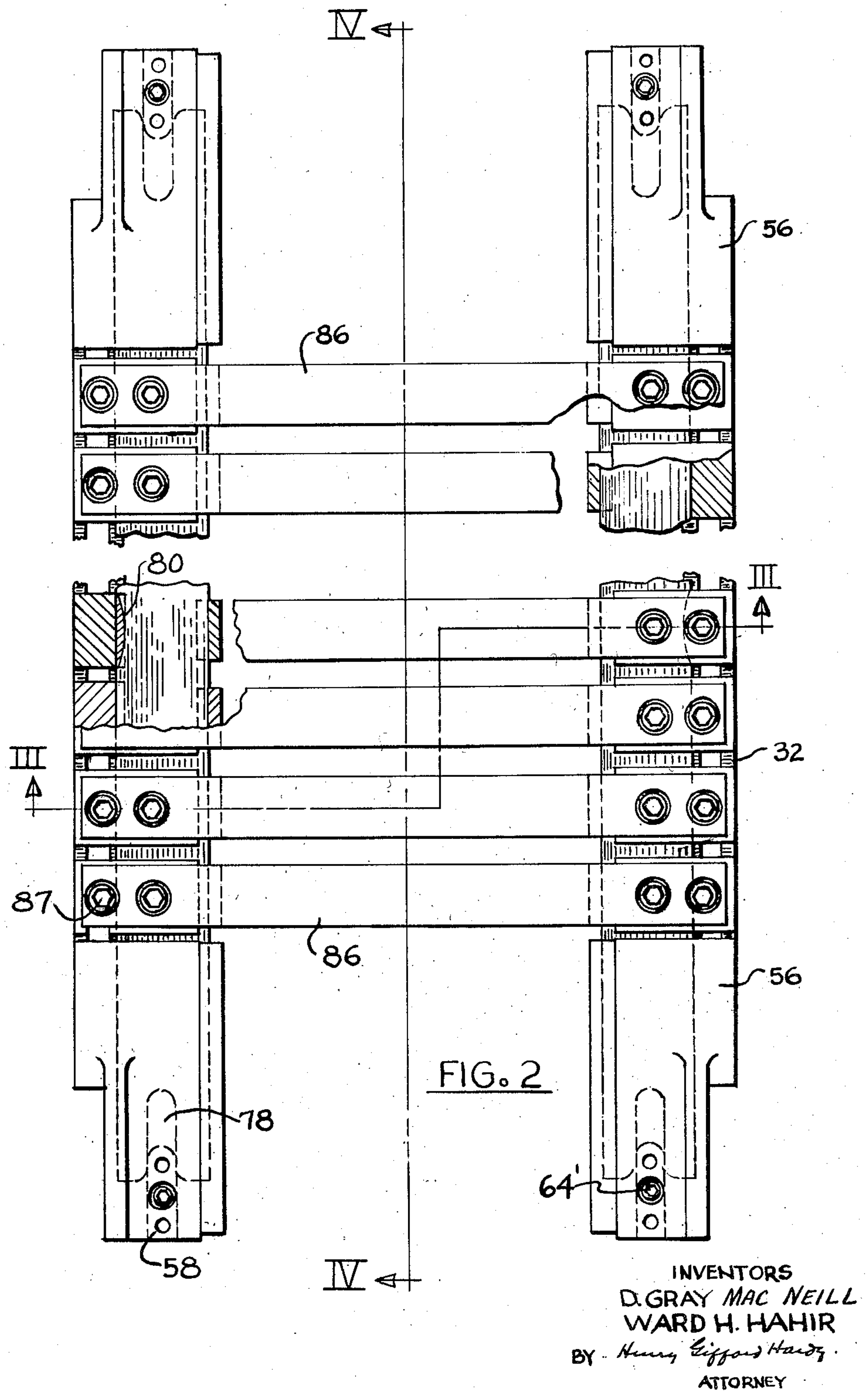
Figure 2 is a fragmentary plan view showing the end portions of the flexible upper sections of the return track assembly illustrated in Figure 1.

As best shown in Figure 1, the terminal fittings 56 at the free ends 38 of the flexible track sections 28 and 32, respectively, are attached by bolts or other conventional means to short rigid track sections 88 having extremities 91 thereof shaped to form bearing saddles 44 which are adapted to be affixed to and to provide support for the idler sprocket assembly 21 of Figure 18.

The component parts of the flexible delivery and return track sections 28 and 32 respectively are retained in spaced-apart parallel relationship by the bridge members 86 so that these flexible sections of track may be readily adjusted to any position intermediate the lowermost position and uppermost positions illustrated by the dotted and solid lines respectively in Figure 18. The laminated springs 72 tend to hold the track sections 28 and 32 in the desired normal path of the conveyor, but when the requirement exists, these flexible track sections can be bent into another position, illustrated by the dotted lines in Figure 4, in opposition to the action of the springs 72. Flexure of the sections 28 and 32, and pivotal movement of the idler sprocket assembly 21 carried thereby, occur about a pivotal point 89 preferably located at a predetermined point intermediate the terminal fittings 56 of the flexible sections 28 and 32. Flexure of the delivery track sections 28 imparts to the upper conveying section 26 a limited pivotal movement about the pins 27 as an axis, as illustrated by the dotted and solid line portions of the section 26 in Figure 18. In the conveying of relatively long longitudinal objects over curved sections of track, it is desirable that the radius of curvature of arcuate portions of the delivery track, such as the portion 53, be as great as possible, and that the swinging movement of the conveying track section 26 about the pins be as limited as possible. The movement imparted to the delivery section 26 by flexure of the flexible section 28 will vary with the amount of flexure thereof and the relative lengths of the articles to be conveyed across the curved and angular portions of the delivery track 23. In some applications, it may be desirable to replace the pins 27 with a short flexible vertebrae-type track section similar to the section 31. It should also be noted that in other applications the lengths of the flexible sections 28 and 32 may sometimes be sufficiently extended that the pins 27 can be dispensed with, so that in such applications no pivotal movement of the upper conveying section 26 will be required. Whenever limited pivotal movement of the track section 26 is desirable, there is preferably provided a kidney slot bearing 47 which is adapted to engage with a pinion 46 secured to the upper portion of the track 26 so as to provide additional support therefor.

Figures 4, 5, 6:
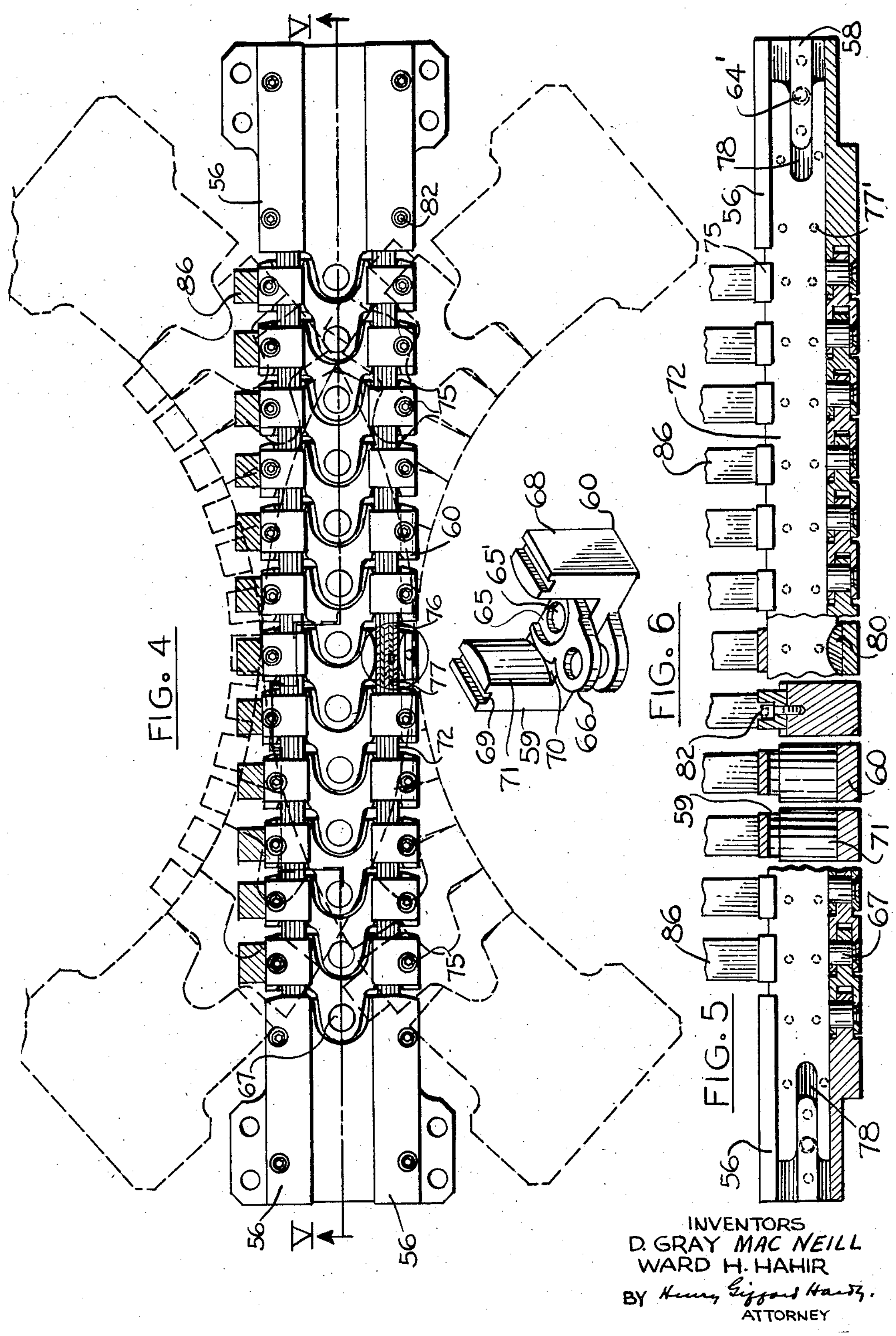
Figure 4 is a transverse sectional view of the flexible upper track section taken along the lines IV—IV of Figure 2, and illustrates by dotted lines the range of vertical adjustment thereof.
Figure 5 is a fragmentary plan view of the flexible track section illustrated in Figure 4.
Figure 6 is a perspective view of a typical clevis link which forms the vertebrae type flexible track section shown in Figure 4.
Figures 7, 8:
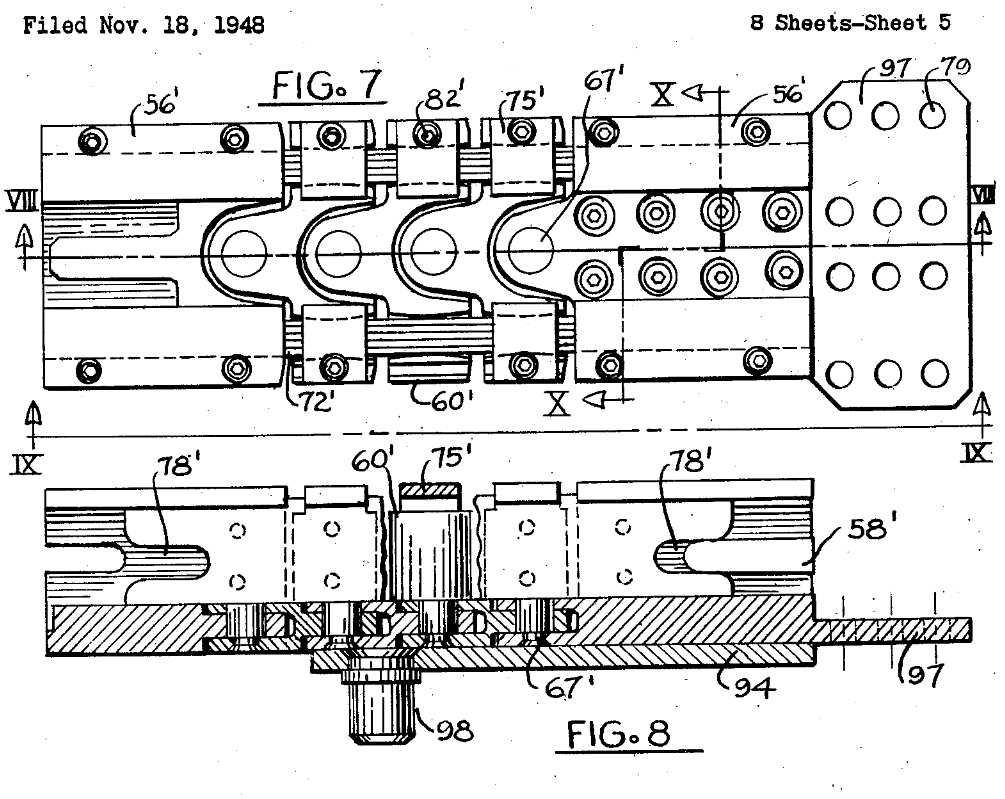
Figure 7 is a side elevational view to an enlarged scale of the flexible lower section of the delivery track assembly illustrated in Figure 1.
Figure 8 is a cross-sectional view taken along the line VIII—VIII in Figure 7.
Figure 9:
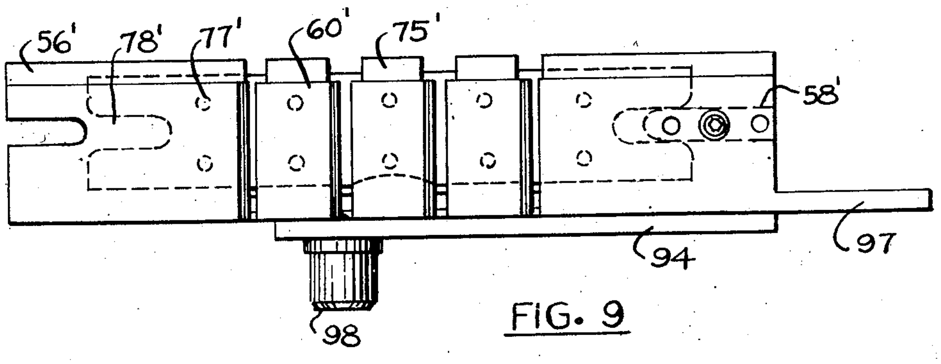
Figure 9 is a front elevational view of the flexible lower track section illustrated in Figure 7.
Figure 10:
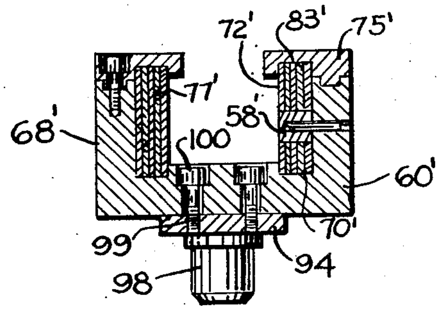
Figure 10 is a cross-sectional view taken along the line X—X in Figure 7.

As is illustrated by the dotted lines appearing in Figure 4, the flexible sections 28 and 32 enable a curvature of approximately 60 degrees to be formed in a vertical plane in either direction from normal. The curvature which results from this flexure is absorbed in small amounts by the pivotal movement of each link 60 about the pins 67 and is equally distributed between the plurality of links 60 which are illustrated in Figure 4. The number of links 60, the links of the flexible sections 28 and 32 and the links of the spring strips 72 may all be varied to accommodate the load and the contemplated variations thereof.

The fixed lower return track section 29 is similar to the fixed lower loading section 25 and is affixed to the plates 40 and 41 in the same manner. The upper return track section 30 is formed with a much shorter radius of curvature for the arcuate portion 35 thereof and the corresponding portion 53 of the upper conveying track section 26. The return track section 30 preferably is supported on the upper portion 63 of the fixed lower return section 29 by the intermediate flexible track section 31, and is adapted to swing throughout a substantially greater arc than the upper conveying track section 26. For example, the arc through which the return track section 30 is permitted to swing may be twelve or more times as great as the maximum angle of swing for the upper conveying section 26. Thus, the major portion of the reorientation of the track made necessary by readjustment of the flexible articulated sections 28 and 32 occurs in the swinging movement of the section 30 of the return track assembly 24 which conveys and transports no load, and only slight adjustments in the position of the critical load-carrying track section 26 are required as the position of the serpentine flexible sections 28 and 32 is changed. Since only a slight range of adjustment for the section 26 is normally required, no difficulty is encountered in continuously moving aligned relatively long longitudinal objects across the curved portion thereof regardless of the position of the flexible track section 28 which is associated therewith.

The general arrangement of the intermediate flexible track section 31 which adjustably supports the lower portion of the movable return section 30 on the upper portion of the fixed lower return section 29 is best illustrated in Figures 7, 8, 9 and 10. The flexible section 31 is generally similar in construction to the flexible track sections 28 and 32 but is much shorter and consists of fewer clevis links 60′ and shorter laminated springs 72′ securely held in the slots 70′ by the clamp members 75′. The plate 94 and pinions 98 affixed thereto are secured to the bottom portion of the flexible section 31 by screws 99 having heads 100 recessed below the bottom surface of the channel formed by the links 60′. The gusset plate 97 which is affixed to one terminal 56′ of the short articulated section 31 fixedly secures the same to the lower extremity 48 of the movable return track section 30 by means of suitable bolts extending through the holes 79. The opposite terminal fitting 56′ of the section 30 is formed in a manner similar to the terminal 56 of the flexible sections 28 and 32. The pinions 98 are journalled in suitable bearings of conventional design which support the section 30 for pivotal movement about the axis of the pinions 98. The flexing action of the intermediate flexible track sections 31 is similar to the flexing action of the longer articulated sections 28 and 32. The plates 94 and pinions 98, however, assist the articulated links 60′ in establishing a smooth transitional movement of the chain 20 across the sharply curved articulated junction between the track sections 29 and 30. As in the case of the pivotal connection 27 joining the conveying track section 26 to the fixed loading section 25, the particular selection of sliding or pivotal elements for the flexible section 31, as well as the number of articulated elements and the lengths thereof, may be varied in accordance with the particular flexure requirements and the nature of the loads imparted thereto by the continuous or intermittent movement of the linked roller chain 20. In applications wherein the curvature of the delivery path is slight and the length of the articulated sections 28 and 32 is relatively long, the construction disclosed can sometimes be modified by replacing the articulated sections 31 with simple pin connections 27.

A pin 62 and kidney bearing assembly 61 are also preferably provided to assist in supporting the arcuate portion 35 of the upper return track assembly 30 and adapted to accommodate a much wider swinging movement of the track section 30 than the corresponding kidney bearing 47 which aids in supporting the corresponding portion 53 of the conveying track section 26. It is to be noted that the delivery track 23 and return track 24 are parallel at both the take-up and delivery ends thereof. It should also be noticed that it is desirable to move the flexible delivery track section 28 as little as possible and to concentrate substantially all the movement or distortion resulting from flexure and operation of the associated track section to the flexible return track section 32 where no conveying loads are carried and the amount or degree of change in the position of the track is of relatively little importance.

Figures 11, 12, 13:
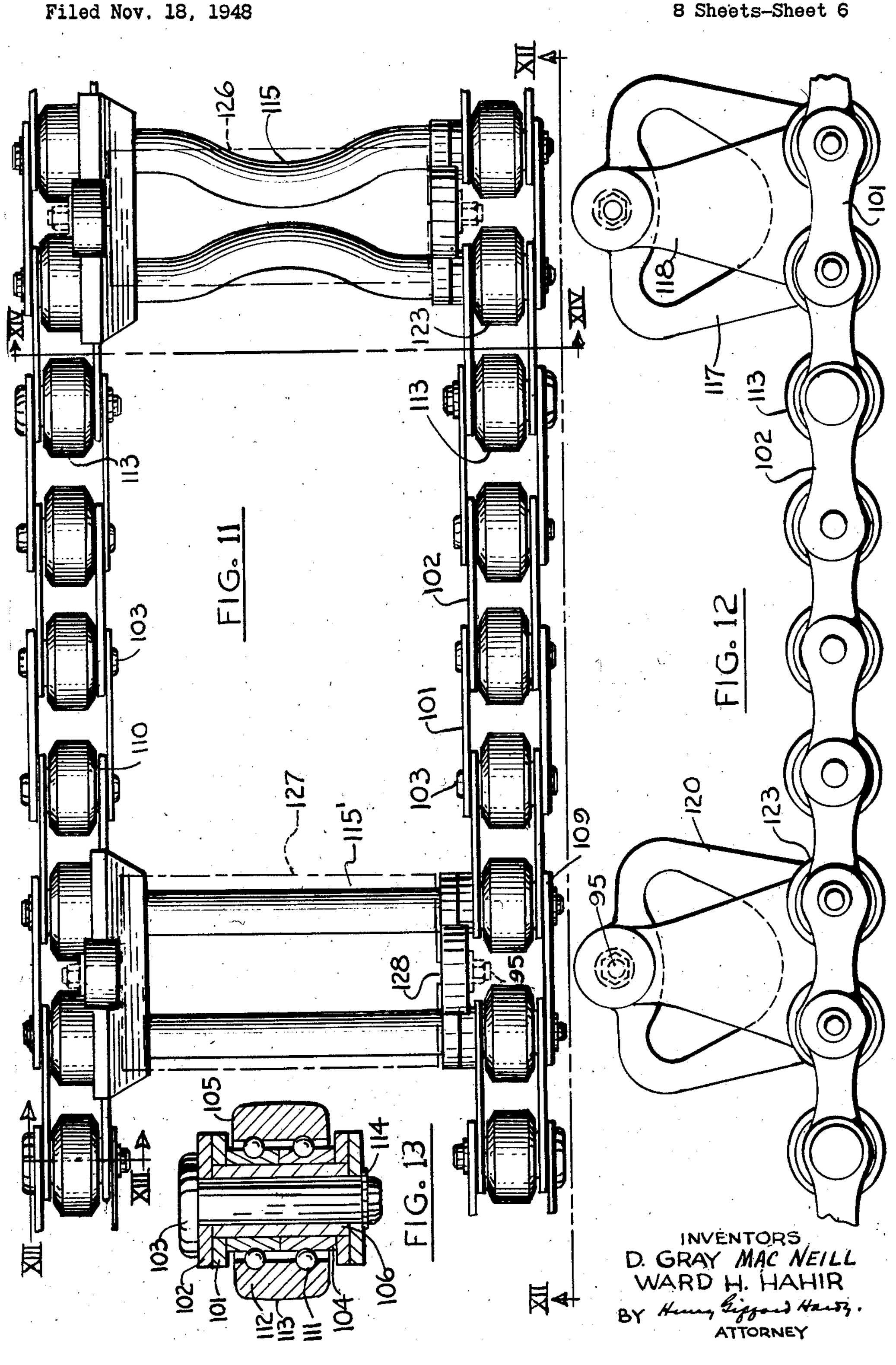
Figure 11 is a plan view of a typical section of the link roller type chain for the track assembly shown in Figure 1.
Figure 12 is an elevational view of a typical section of the link roller type chain illustrated in Figure 11.
Figure 13 is a cross-sectional view to an enlarged scale taken along the line XIII—XIII of Figure 11.
Figures 14, 15, 16, 17:
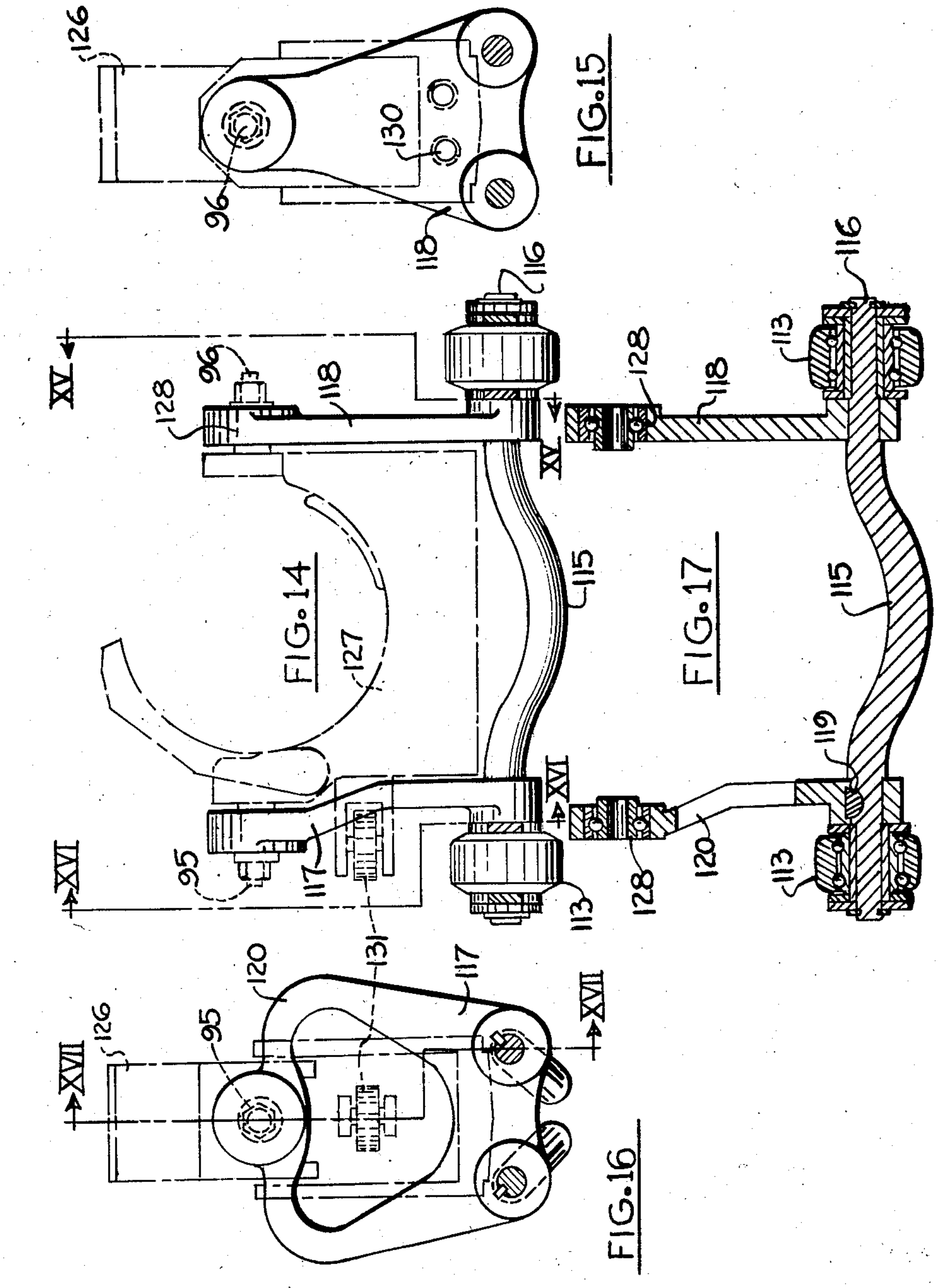
Figure 14 is a front elevational view of the link roller type chain illustrated in Figure 12.
Figure 15 is a sectional view taken along the line XV—XV in Figure 14.
Figure 16 is a sectional view taken along the line XVI—XVI in Figure 14.
Figure 17 is a cross-sectional view taken along the line XVII—XVII in Figure 16.

Figures 11, 12, and 13 show in detail the preferred form of construction for the endless roller linked chain 20 and the automatic clamping devices 126 and 127 associated therewith. The chain 20 is preferably, though not necessarily, of a conventional construction having articulated side portions 109 and 110, each of which includes a plurality of roller link assemblies 113. Each link assembly includes a pair of staggered steel side bar lengths 101 and 102 pivotally joined at the end portions thereof by pins 103 which extend through the bushings 106, as shown in Figure 13. Each of the side bar members 102 is pivotally supported on the pin 103 with one side thereof in contact with one end of the bushing 106, and the other side of each member 102 bears against the coacting surface of a side bar member 101, which has its other surface bearing against the inner raceway 104 of the high-precision ball bearings 111. The outer raceway 105 for the bearings 111 is formed with an outer peripheral rolling surface 112 having an exterior configuration closely conforming to the shape of the chain-guiding channels 34 of the delivery track assembly 23 and the return track assembly 24. The pins 103 may be retained in place by any conventional means, such as the ring retainers 114, but preferably the pins 103 are readily removable to facilitate repair and replacement of the detachable roller assemblies 113 which comprise the chain 20.

Spaced apart periodically at convenient intervals along the chain 20 are pairs of transverse link members 115 and 115′ each having oppositely disposed end portions 116 adapted to receive and rotatably support thereon adjacent pairs of roller assemblies 123. Thus, no pin 103 is required to assemble the assemblies 123 which are mounted on the end portions 116 of the link members 115 and 115′. The end portions 116 of the link members 115 and 115′ retain in a predetermined spaced-apart relationship the roller assemblies 123 which comprise the chain 20, so that the roller elements 112 will coact with the guiding channels 34 of the delivery track assembly 23 and the return track assembly 24.

The outer extremities 116 of the transverse links 115 and 115′ also receive and support the oppositely disposed and spaced-apart cradle members 117 and 118, which provide pivotal support for the alternating series of forward and rear clamping mechanisms 126 and 127, respectively, which are placed at convenient spaced-apart intervals along the chain 20 and move therewith along the tracks 23 and 24. The cradle members 117 are secured to the extremities 116 of the links 115 and 115′ by the key 119, so as to rock in accordance with the turning movement of the links 115 and 115′ as the chain 20 traverses the arcuate portions of the delivery and return tracks 23 and 24. The cradle member 117 is formed with a bifurcated yoke portion 120 having a cam follower 131 positioned therebetween. The cradle member 118 is supported on the extremities 116 of the links 115 and 115′, and has two spaced-apart control pins 130 adjacent to the base thereof. Each pair of oppositely disposed cradle members 117 and 118 provides a transversely aligned pair of ball-bearing supports 128 for the oppositely disposed rocker pins 95 and 96 of each of the clamping mechanisms 126 and 127, so as to permit a free turning or rocking movement about the horizontal axis of the bearings 128 as the long longitudinal articles being conveyed traverse the arcuate portions of the delivery track assembly 23.

To facilitate the conveyance of relatively long rigid objects along the arcuate and angular sections of the delivery path, and to permit the accurate discharge of such objects at the delivery end of the conveyor, it is sometimes desirable that the free rocking movement of the forward and rear clamping mechanisms 126 and 127 be automatically controlled so that the rocking movement about the pins 95 and 96 be automatically terminated after the curved portions of the delivery track have been traversed. It may also be desirable that no further rocking movement about the axis of the bearings 128 occurs after a predetermined position adjacent to the delivery section 88 has been reached, or during the return path determined by the track assembly 24 wherein no conveyance of such long rigid objects occurs. Moreover, the automatic loading of such objects may sometimes be facilitated by preventing the rocking movement about the axis of the bearings 128 until after each pair of the clamping devices 126 and 127 has been reloaded with another object to be conveyed over the arcuate and angular delivery course determined by the track assembly 23. Although the rocking movement about the axis of the bearings 128, as well as the gripping and releasing action of such automatic devices 126 and 127, may be controlled by actuating the pins 130 and operating the actuating rollers 131 at predetermined positions along the track, any type of conventional automatic clamping and releasing device may be used with the conveyor chain and endless conveyor track arrangement of the instant invention without departing from the scope thereof. The selection of the clamping and releasing mechanism to be employed and the location thereof along the chain 20 depends to a large extent upon the particular configuration of the relatively long longitudinal articles to be conveyed, the rapidity with which the conveying operation is to be performed, the degree of curvature present in the arcuate sections of the conveying path, and whether the conveying operation is to be continuously or intermittently performed.

*Operation*

In operation flexible delivery track sections 28 and 32 and the end fittings 88 carried thereby are adjusted to the desired vertical position by a predetermined pivotal movement of the adjustable idler sprocket assembly 21 about the point 89. Only a slight readjustment in the position of the upper conveying section 26 of the track 23 results from readjustment of the flexible delivery section 28, and substantially all of the reorientation in the position of the track resulting from the flexure and readjustment in the position of the section 28 is automatically concentrated in the articulated upper return track section 32 which does not require the conveying of relatively long rigid articles thereacross. During this readjustment in the position of the sections 28 and 32, no slack is taken up in the chain 20 by the pivotal movement of the idler sprocket 21 about the point 89. The radius of curvature of the arcuate portions of the upper conveying section 26 is relatively large and since only very limited movement of this section of the conveyor track results when the preferred form of track arrangement is employed, the conveyance of relatively long longitudinal articles thereacross is not impeded or hindered by flexure of the section 28 of the delivery track assembly 23.

As soon as the track section 28 and the attached fittings 88 are reoriented to the new position required by the particular conveying operation to be performed, the long longitudinal articles to be conveyed may, if desired, be raised in continuous sequence by a conventional elevating mechanism to a position immediately adjacent to the horizontal portion 36 of the fixed lower loading section 25 for automatic and continuous engagement with the forward and rear clamping mechanisms 126 and 127. Power is then supplied to the drive sprocket assembly 22 to effect the movement of the chain 20 over the adjustable idler sprocket 21 and along the path determined by the delivery track assembly 23 and the return track assembly 24. As each of the articles to be conveyed actuates the automatic clamping members 126 and 127 so as to be held in clamping engagement thereby, the closing action of the clamps 126 and 127 permits the pins 95 and 96 to rock in the bearings 128 during the next delivery cycle and until the actuator rollers 131 are again operated by suitable cams near the idler sprocket 21, thereby permitting relatively long articles to be conveyed over the arcuate sections of the delivery track. Thereafter the long rigid articles are transported by the chain 20 in a continuous aligned relation along the delivery track assembly 23 which includes in series the fixed lower loading section 25, the upper conveying track section 26, and the flexible delivery track section 28. As soon as each of the articles carried by the endless conveyor chain 20 reaches the delivery end 88 thereof, which is adjacent to the adjustable idler sprocket 21, the cam actuators 131 preferably contact suitable cams carried by the upper portion of the delivery track assembly 23. In this manner, the automatic clamping mechanisms 126 and 127 are released so that each article conveyed is accurately delivered to a predetermined position and is free to leave the endless chain conveyor as it approaches a position immediately adjacent to the idler sprocket 21. Thereafter the elements which comprise the unloaded endless conveyor chain 20 are free to move over the idler sprocket assembly 21 and to return to the drive sprocket assembly 22 over the return track assembly 24, which includes in series the flexible return track section 32, the upper return track section 30, the intermediate flexible track section 31, and the fixed lower return section 29. Preferably all rocking movement of the pins 95 and 96 in the bearings 128 is also automatically terminated during the return cycle of the chain 20 simultaneously with the releasing action of the actuator rollers 131 at the delivery end of the chain. Immediately following the delivery of each article by the endless conveyor, all further pivotal movement about the axis of the pins 95 and 96 preferably is suspended throughout the return cycle of the conveying chain 20 so that the clamping mechanisms 126 and 127 will be oriented in the proper position for the next loading operation.

Flexture of the flexible delivery and return track sections 28 and 32 results in substantially equally distributed relative movement of the yoke portions 66 of each of the vertebrae type clevis links 60 about the connecting pins 67 as a center. Articulation of the sections 28 and 32 occurs in opposition to the action of the spring strips 72 which tend to return the sections 28 and 32 to their normal position. The individual spring strips 76 are not rigidly held, however, by the clevis links 60 and are free to conform to the increase or decrease in the lengths of the arc as the articulated section is established in a different position. During flexure of the sections 28 and 32 the keyway 78 formed in the end portions of the spring 72 is free to slide back and forth over the key 58 as needed, thereby lengthening or shortening the portion of the spring 72 which extends along the articulated medial portions of the flexible track sections 28 and 32. Articulation of the clevis links 60' and relative movement between the links 60' and the spring strips 72' for the intermediate flexible track section 31 occurs in the same manner as in the sections 28 and 32, except that the intermediate section 31 includes fewer clevis links 60' and the flexure or articulation occurring in the section 31 is of smaller magnitude.

Flexure of the delivery and return track sections 28 and 32, resulting from readjustment of the delivery end of the endless chain conveyor 20 preferably imparts a pivotal movement of minimum magnitude to the upper conveying section 26 while imparting a pivotal movement of much larger magnitude to the upper return track section 30. The articulated track arrangement disclosed herein distributes substantially all pivotal movement of the sections 26 and 30 required by reorientation of the flexible sections 28 and 32 respectively in such a manner that all such pivotal movement is localized in the upper return track section 30, with the result that only a very limited pivotal movement of the conveying track section 26 is required. Thus, a relatively wide swinging movement of the return track section 30 in no way hinders or impedes the conveying of relatively long articles over a curved delivery path, since no such articles are transported over any portion of the return track assembly 24.

Although the preferred form of endless conveyor disclosed herein is readily adaptable for use in high-speed conveying operations wherein automatic clamping and releasing mechanisms carried by the endless roller chain 20 are employed to convey relatively long rigid articles in either continuous or interrupted sequence over an adjustable delivery track having both straight and arcuate sections therein, it will be readily apparent to those skilled in the art that many modifications thereof may be made to meet varied delivery and operating requirements without departing from the scope of the invention disclosed herein. It will be equally apparent that conveying operations may be performed at relatively slow speeds where manual loading and unloading is to be employed or in automatically controlled conveying operations wherein the radius of curvature of the arcuate sections of the delivery track is large with relation to the lengths of the rigid articles to be conveyed. Many modifications of the preferred form of flexible endless conveyor disclosed herein may be made in which many of the various sections which comprise the track assemblies 23 and 24 can be substantially simplified or eliminated. In some applications, for example, only a single layer of chain forming a closed loop substantially in a single plane may be required, resulting in the elimination of one layer of double track in the endless conveyor system. In still other conveying operations a rigid unpivoted upper delivery track section 26 may sometimes be employed, particularly if the length of the flexible sections 28 and 32 is to be relatively great with relation to the length of the other track sections which comprise the flexible endless conveyor. Flexible articulated elements can also be provided for the lower loading and return sections 25 and 29 of the flexible conveyor without departing from the scope of the instant invention.

From the above description it will be apparent that this invention provides an endless conveyor system having at least one end portion thereof which is readily adjustable without the employment of idlers to take up slack in the system as it is suggested and which includes a track therefor which includes both curves and reverse curves joined by rigid and flexible track sections. There has also been produced a method and means of providing articulation and flexibility of adjustment in an endless conveyor system along a delivery path in such a manner that the portions thereof will not hinder or impede the conveyance of relatively long longitudinal articles along the delivery path. Provisions have also been made to provide an adjustable track for an endless conveyor system having both rigid and flexible delivery and return sections which defines a serpentine conveying path over which relatively long articles can be transported in aligned relationship without being impeded in their normal movement by the articulation of the flexible track sections. There has also been provided an articulated track arrangement for a flexible endless conveyor system having both delivery and return track sections disposed along a non-linear path wherein substantially all movements of the track sections resulting from flexure and articulation of the conveyor system is localized in the return portions thereof.

We claim:

1. A flexible track for an endless conveyor system comprising in combination non-parallel return and delivery track assemblies established in substantially the same plane and composed of rigid and articulated sections in series, the said articulated sections being supported in a normal position by multiple spring members adapted to allow the single plane movement of the free end of the said track assembly in such a manner as to provide flexibility of adjustment for the said track within a predetermined zone adjacent to at least one end of the said conveyor, and a further intermediate articulated section to equalize the length of the track in accordance with the adjusted position.

2. A flexible endless conveyor system comprising in combination an endless conveying chain directed by appropriate sprockets and idlers to non-parallel return and delivery track assemblies composed of rigid and articulated sections in series all within substantially the same plane, the said articulated sections being supported in a normal position by resilient members so constructed and arranged as to permit the single plane movement of the free end of the said track assembly, thereby enlarging the range of adjustment of the said flexible conveyor to a sector through which the free end of the said track assemblies can pivot about an axis substantially perpendicular to the delivery path of the said conveyor, and a further articulated section in one of the track assemblies to equalize the length of the track to take up any slack in said chain in the adjusted position.

3. A flexible twin track for an endless chain conveyor system comprising in combination return and delivery track assemblies established substantially in the same plane composed of two identical tracks held in parallel spaced-apart relationship by suitable cross members, each of the said track assemblies including both rigid and flexible sections arranged in series, and a further flexible section in the return section of each assembly, the said flexible sections comprising a plurality of articulated clevis links supported by leaf type spring members slidably running therethrough, each of the said spring members having free end portions and a medial portion capable of self-adjustment for arcuate length during articulation of the said flexible sections.

4. A flexible track for a linked roller chain comprising in combination a series of articulated clevis links forming a flexible track attached together by pivotal bearings so constructed and arranged as to allow articulated movement of the said links in one plane, a plurality of resilient means extending longitudinally through the said links forming the upper and lower guides for said track and adapted to apply substantially a uniform tension to each of the said links, the said resilient means being further adapted to adjust itself to necessary differences in arcuate lengths in such a manner as to compensate for variation in the curvature of the flexible track during flexure thereof.

5. A flexible track for a linked roller chain comprising in combination a plurality of vertebrae type link members pivotally joined together to form a flexible track so constructed and arranged as to allow articulated movement of the said link members in one plane, a plurality of resilient means extending longitudinally through the said links forming the upper and lower guides for said track and adapted to apply substantially a uniform tension to each of the said link members, the said resilient means being further adapted to adjust itself to necessary differences in arcuate lengths in such a manner as to compensate for variations in the curvature of the flexible track during flexure thereof.

6. A flexible track for the conveying of long, rigid objects comprising alternate rigid and flexible track sections which include a series of articulated joints pivotally attached to allow the free movement of the said joints in substantially the same plane as the path of said objects, resilient means inserted longitudinally through all the said joints adapted to apply a substantially uniform tension to all of the said joints and to allow movement of the said flexible track along various smooth arcuate paths in such a manner as not to impede or hinder the conveying of the said long, rigid objects along the said flexible track, and flexible track means to equalize the track length according to the adjusted position.

7. A flexible endless conveyor for long, rigid objects comprising in combination twin linked roller conveyor chains of uniform length and substantially constant tension with spaced adjustable automatic carrier clamps formed therebetween, twin sets of adjustable track for the said conveyor chains composed of alternate rigid and flexible track sections which flexible track sections include a series of articulated joints pivotally attached to allow the free movement thereof in one plane, a plurality of laminated spring elements inserted longitudinally through all the said joints adapted to apply a substantially uniform tension to all of the said joints and to allow movement of the said adjustable track along various smooth, arcuate paths in such a manner as not to impede or hinder the conveying of the said long, rigid objects along the said adjustable track, and twin flexible intermediate sections in said tracks for maintaining the uniform length and tension of the chains.

8. A flexible track for an endless conveyor system comprising in combination an endless conveying chain attached by appropriate sprockets and idlers to straight and arcuate return and delivery track assemblies, the said delivery track assemblies comprising in series a fixed lower loading section, an upper conveying section pivotally supported on the said fixed lower loading section for limited rocking movement with respect thereto, and an articulated flexible delivery track section, the said return track assembly comprising in series a fixed lower return section, an upper return track section movably supported on the said lower return track section by an articulated joint, and a flexible return track section.

9. A flexible track for an endless conveyor system adapted to convey long, rigid objects along a path including curves and reverse curves comprising in combination an endless conveying chain attached by appropriate sprockets and idlers to curved and angularly disposed return and delivery track assemblies, the said delivery track assemblies comprising in series a fixed lower loading section, an upper conveying section supported on the said fixed lower loading section, and an articulated flexible delivery track section, the said return track assembly comprising in series a fixed lower return section, an upper return track section movably supported on the said lower return section by an articulated joint, and a flexible return track section.

References Cited in the file of this patent

UNITED STATES PATENTS

| | | |
|---|---|---|
| 2,210,655 | Doberstein | Aug. 6, 1940 |
| 2,242,206 | Bisset | May 20, 1941 |
| 2,250,933 | Manierre | July 29, 1941 |
| 2,269,078 | Cartlidge | Jan. 6, 1942 |

FOREIGN PATENTS

| | | |
|---|---|---|
| 363,649 | Germany | Nov. 11, 1922 |